(12) United States Patent
Tseng

(10) Patent No.: US 6,461,498 B2
(45) Date of Patent: Oct. 8, 2002

(54) ARTIFICIAL SPA GENERATOR

(76) Inventor: Fu-Ching Tseng, No. 52, Alley 16, Lane 71, Jiang Nan St., Taipei (TW)

( * ) Notice: Subject to any disclaimer, the term of this patent is extended or adjusted under 35 U.S.C. 154(b) by 0 days.

(21) Appl. No.: 09/734,900

(22) Filed: Dec. 13, 2000

(65) Prior Publication Data

US 2001/0037963 A1 Nov. 8, 2001

(30) Foreign Application Priority Data

May 8, 2000 (TW) ........................................ 89207608 U

(51) Int. Cl.⁷ .................. A61H 33/00; B01D 35/02
(52) U.S. Cl. .................. 210/87; 210/103; 210/202; 210/206; 210/259; 210/263; 210/295; 4/DIG. 10
(58) Field of Search .................. 210/87, 103, 149, 210/169, 198.1, 202, 206, 259, 260, 263, 295, 317, 266; 607/81, 85, 86, 87; 4/DIG. 10; 137/268

(56) References Cited

U.S. PATENT DOCUMENTS 4,317,732 A * 3/1982 Shoquist
4,859,345 A * 8/1989 Inagaki
5,616,239 A * 4/1997 Wendell et al.

FOREIGN PATENT DOCUMENTS

| DE | 3719675 A1 | * | 3/1989 |
| JP | 1-242115 | * | 9/1989 |
| JP | 7-16407 A | * | 1/1995 |
| JP | 9-84846 A | * | 3/1997 |
| JP | 9-103617 | * | 4/1997 |
| JP | 10-225390 | * | 8/1998 |
| TW | 266472 | * | 6/1984 |

* cited by examiner

Primary Examiner—Joseph W. Drodge
Assistant Examiner—Terry K. Cecil
(74) Attorney, Agent, or Firm—Troxell Law Office PLLC

(57) ABSTRACT

An artificial spa generator includes a clean water part 10, a spa generating part 20, and a first guide pipe 15 connecting the clean water part outlet and the spa generating part inlet. A dirt removing filter element 12, a softening filter element 13, and an active carbon filter element 14 are provided in the clean water part. The spa generating part has spa medical stones 21 for introducing minerals into the water. Flow meters 40, 41 are provided upstream and downstream of the clean water part for determining when the filter elements should be changed. A valve/piping arrangement is also included for introducing an odor essence into the spa water from an odor essence storage section 32. A thermometer 50 may also be provided therein.

8 Claims, 2 Drawing Sheets

ARTIFICIAL SPA GENERATOR

BACKGROUND OF THE INVENTION

1. Field of the Invention:

The present invention relates to an artificial spa generator, and particularly to an artificial spa generator with flow rate and temperature indications.

2. Description of Related Art:

Taking spa baths can promote blood circulation, get rid of tiredness, and keep one's face beautiful so that it is a good way to relax one's body and mind. However, a natural spa is usually near a specific area such as a mountain such that it is inconvenient for us to take a spa bath while we are desired to enjoy the fun of taking spa bath. Taiwanese patent publication No. 266472 discloses a spa device for face beauty, with which the spa can be made artificially. The spa device provides hot water passing through special treating stones and a sulfur essence in the process of making the spa. The special treating stones collect the contaminating substance in the hot water and release the mineral into the hot water and the concentrated sulfur can drip several drips of sulfur to mix with the hot water. But, the special stones are not able to absorb the hard water ingredients such as chlorine ion, calcium ion, and magnesium ion in the hot water. In addition, there are other defects such as the temperature of the spa may not be indicated and if the spa device is still in an effective period.

SUMMARY OF THE INVENTION

An object of the present invention is to provide an artificial spa generator, which may offer pure spa and/or order essence water.

Another object of the present invention is to provide an artificial spa generator, which may indicate the temperature of spa and/or the temperature of the order essence water and the accumulated used spa.

Other objects and features of the present invention will be apparent by way of following description of embodiments with accompanying drawings.

DETAILED DESCRIPTION OF THE PREFERRED EMBODIMENTS

Figure 1:
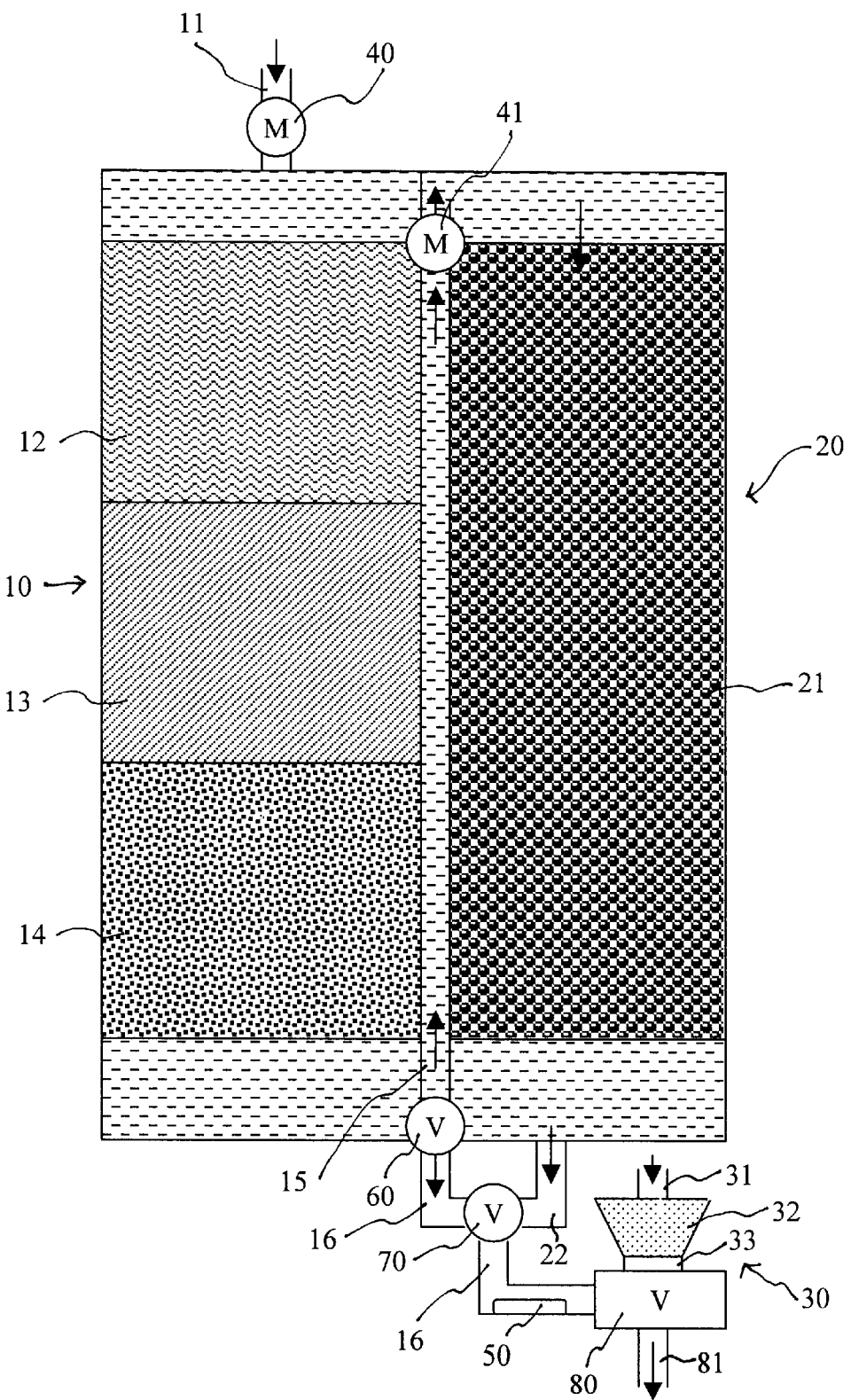
FIG. 1 is a plan view of an artificial spa generator according to the present invention to illustrate the structure in the first embodiment thereof.

Referring to FIG. 1, the artificial generator of the present invention in a first embodiment thereof is illustrated. The artificial spa generator comprises a clean water part 10, a spa generating part 20, an order essence mixing part 30, a first flow meter 40, a second flow meter 41, a thermometer, a first control valve 60, a second control valve 70, and a third control valve 80. A water inlet pipe 11 communicates the clean part 10 and the first flow meter 40 joins to the water inlet pipe 11. The clean water part 10 provides a dirt removing filter element 12, a softening filter element 13 and an active carbon filter element 14. The dirt removing filter element 12 is made of cotton, and the softening filter element 13 is made of positive ion resin. The first control valve 60 located at the bottom of the clean water part 10 connects with the upper end of the spa generating part 20 via a first guide pipe 15 and connects with the order essence mixing part 30. The first guide pipe 15 further joins the second flow meter 41. The spa generating part 20 is provided with spa medical stones 21 therein and connects with a spa pipe 22. The medical stones includes mineral elements such as Ca, Na, Mg, Si, Fe, Sr, Al, K, Ti, Mn, Zn, Y, Ba, and U. The second guide pipe 16 joins the second control valve 70 so as to connect with the spa pipe 22. The odor essence part 30 at the upper end thereof is provided with an odor essence inlet 31 and has an odor essence storing section 32 with an odor essence switch 33 at the outlet thereof to connect with the third control valve 80. The third control valve 80 communicates with the second guide pipe 16 and the third guide pipe 81. A thermometer 50 is located on the second guide pipe 16 next to the third control valve 80 and has a sensor immersed under the water or spa in the second guide pipe 16.

In practice, the water enters the clean water part 10 through the inlet pipe 11 and the first flow meter 40 records the quantity of incoming flow at this time. It can be realized from the accumulated quantity of the water if each filter element has to be replaced or not. The dirt removing filter element 12 can remove larger grains of dirt, the softening filter 13 can absorb calcium ions and magnesium ions to soften the water, and the active carbon filter 14 can remove chlorine to have the water be purified completely. The purified water can flow toward the spa generating part 20 through the first guide pipe 15 by way of the first control valve 60. The purified water can dissolve mineral elements in the spa medical stone 21 such that the spa containing ingredients of the medical stone 21 may flow outward through the spa pipe 22. The first control valve 60 is a valve of one to two and the second control valve 70 is a valve of two to one. The water, which passes through the clean water part 10, may enter the spa generating part 20 through the first guide pipe 15 or enter the odor essence mixing part 30 through the second guide pipe 16 by way of controlling the first control valve 60. The spa in the spa generating part 20 may flow to the second control valve 70 through the spa pipe 22. The purified water or the spa can be selected to enter the third control valve 80 through the second guide pipe 22 by way of the third control valve 80. The odor essence switch 33 can be operated to control the addition of the odor essence in the purified water or in the spa before the purified water or the spa is discharged through the third guide pipe 81. The third control valve 80 may be the odor control valve arranged in a flushing device mixed with odor essence in an ordinary toilet or may be a water actuated control valve. The odor essence in the odor essence storing section 32 may be operated to flow outward and mix with the purified water or the spa passing through while the odor essence is desired to contain in the purified water or the spa. The thermometer 50 may indicate if the temperature of the purified water or the spa is appropriate. The first flow meter 40 and the second flow meter 41 may indicate the gross water flow into the clean water part 10 and the gross water flow into the spa generating part 20 respectively. The respective gross water is a reference for deciding if filter elements or medical stones 21 have to be replaced.

The present invention makes the water much purer for being more appropriately used by us because of the softening filter element and the active carbon filter element. The flow meter arranged in the present invention allows the user to know the timing for replacing filter elements or spa medical stones such that the good quality of the purified water or the spa can be maintained without any difficulty.

The thermometer provided in the artificial spa device of the present invention may indicate if the temperature of water is in a proper range. The first flow meter may be joined to the third guide pipe for calculating the gross entered water as well. The clean water part provided by the present invention can be connected to the spa generating part and the odor essence section by a guide pipe respectively and the respective guide pipe may be attached a control valve. The spa generating part may connect with another odor essence mixing section through another guide pipe and the another pipe connects with further control valve.

Figure 2:
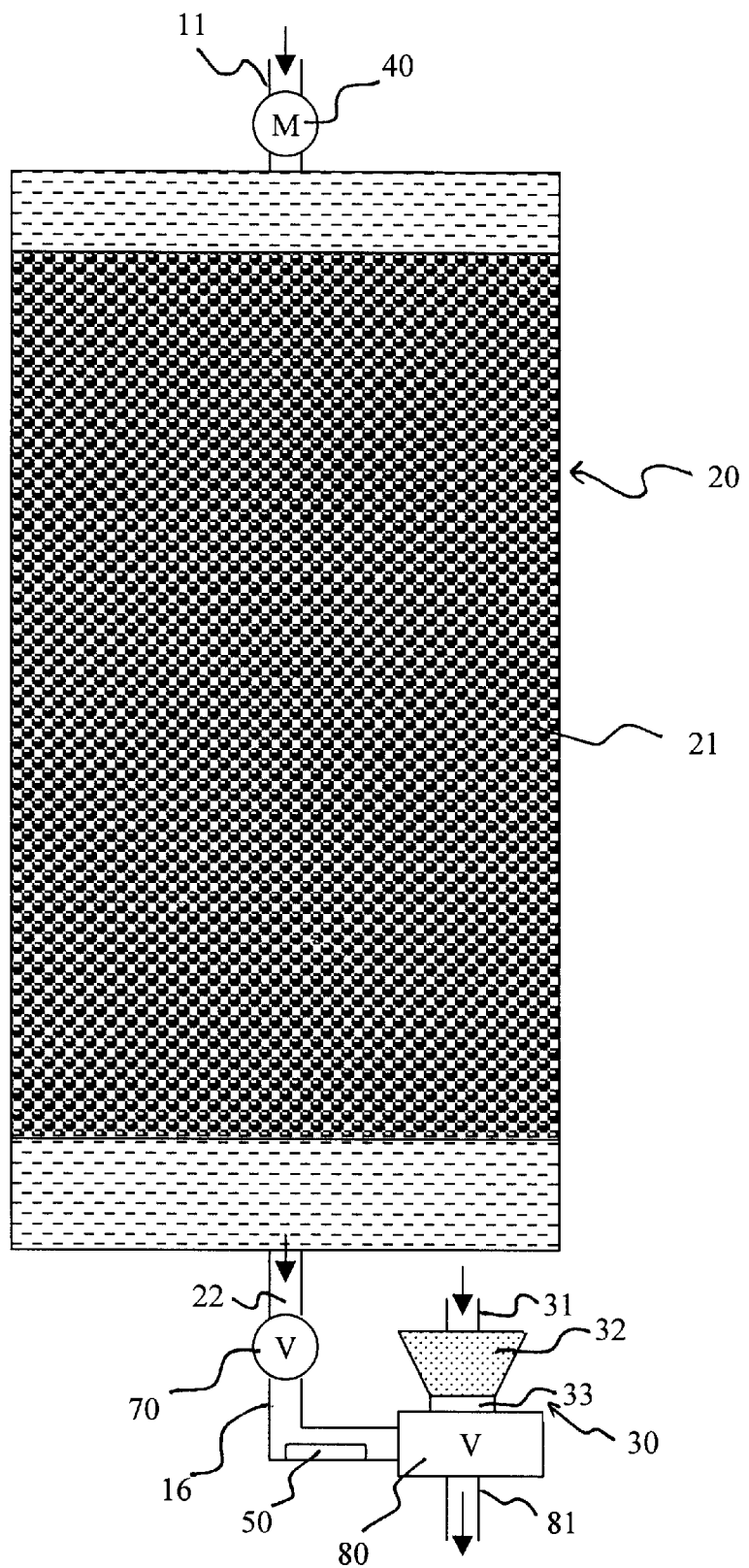
FIG. 2 is a plan view of an artificial spa generator according to the present invention to illustrate the structure in the second embodiment thereof.

If the water entering the artificial spa device of the present invention is very clean, the water can flow into the spa generating part directly. Referring to FIG. 2, another embodiment of the present invention comprises a spa generating part 20, an odor essence mixing part 30, a first flow meter 40, a thermometer 50, and a third control valve 80. The inlet pipe 11 communicates with the spa generating part 20 and the first flow meter 40 is attached to the inlet pipe 11. The spa generating part 20 is provided with the spa medical stones 21 and connects with the spa pipe 22. The spa pipe 22 and the second guide pipe 16 communicate with the second control valve 70 respectively. The odor essence mixing part 30 at the upper end thereof has an odor essence inlet 31 and is provided with an odor essence storing section 32. An odor essence switch 33 is located at the outlet of the odor essence storing section to connect with the third control valve 80. The third control valve 80 connects with the second guide pipe 16 and the third guide pipe 81 respectively. A thermometer 50 is attached to the second guide pipe 16 next to the third control valve 80 and has a sensor under the water or the spa in the second guide pipe 16. The embodiment illustrates the water entering the spa generating part 20 directly and the spa generated can be selected to add the odor essence before the spa flows outward form the third guide pipe 81. The first flow meter 40 may be attached to the spa pipe 22 so as to count the quantity of water moving through the spa generating part 20.

While the invention has been described with reference to preferred embodiments thereof, it is to be understood that modifications or variations may be easily made without departing from the spirit of this invention, which is defined by the appended claims.

What is claimed is:

1. An artificial spa generator comprising:
    a) a clean water part having a water inlet and a plurality of filters, whereby water entering through the water inlet sequentially passes through the plurality of filters;
    b) a first flow meter located in the water inlet;
    c) a spa generating part including spa medical stones therein;
    d) a first guide pipe connecting an outlet of the clean water part and an inlet of the spa generating part;
    e) a second flow meter located in the first guide pipe whereby a comparison of water flow information provided by the first and second flow meters indicates a necessity of changing the plurality of filters;
    f) a second guide pipe connected to the outlet of the clean water part;
    g) a first control valve connected to the outlet of the clean water part, the first guide pipe and the second guide pipe;
    h) a second control valve connected to the second guide pipe;
    i) a spa pipe connected to an outlet of the spa generating part and to the second control valve;
    j) a third control valve connected to the second guide pipe; and,
    k) an odor essence mixing part connected to the third control valve and including an odor essence switch to control addition of odor essence to purified water in the second guide pipe.

2. The artificial spa of claim 1 wherein the plurality of filters includes a dirt removing filter element.

3. The artificial spa of claim 2 wherein the plurality of filters further includes a water softening filter element.

4. The artificial spa of claim 3 wherein the plurality of filters further includes an active carbon filter element.

5. The artificial spa of claim 3 wherein the water softening filter element comprises a positive ion resin.

6. The artificial spa of claim 2 wherein the dirt removing filter element is made of cotton.

7. The artificial spa of claim 1 wherein the spa medical stones comprise mineral elements selected from the group consisting of: Calcium (Ca); Sodium (Na); Magnesium (Mg); Silicon (Si); Iron (Fe); Strontium (Sr); Aluminum (Al); Potassium (K); Titanium (Ti); Manganese (Mn); Zinc (Zn); Yttrium (Y); Barium (Ba) and Uranium (U).

8. The artificial spa of claim 1 further comprising a thermometer located on the second guide pipe.

* * * * *